United States Patent
Hirabayashi

(10) Patent No.: US 12,525,280 B2
(45) Date of Patent: Jan. 13, 2026

(54) SENSE AMPLIFIER CIRCUIT AND FOR SEMICONDUCTOR MEMORY DEVICE WITH CAPACITIVE ELEMENTS FOR INCREASED READ MARGIN

(71) Applicants: Kabushiki Kaisha Toshiba, Tokyo (JP); Toshiba Electronic Devices & Storage Corporation, Tokyo (JP)

(72) Inventor: Osamu Hirabayashi, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 151 days.

(21) Appl. No.: 18/119,690

(22) Filed: Mar. 9, 2023

(65) Prior Publication Data

US 2024/0105253 A1   Mar. 28, 2024

(30) Foreign Application Priority Data

Sep. 22, 2022 (JP) ................. 2022-151634

(51) Int. Cl.
G11C 7/10 (2006.01)
G11C 11/4091 (2006.01)
G11C 11/4094 (2006.01)
G11C 11/4099 (2006.01)

(52) U.S. Cl.
CPC ...... *G11C 11/4091* (2013.01); *G11C 11/4094* (2013.01); *G11C 11/4099* (2013.01)

(58) Field of Classification Search
CPC ............ G11C 11/4091; G11C 11/4094; G11C 11/4099; G11C 16/28; G11C 7/065; G11C 7/12; G11C 2207/002
See application file for complete search history.

(56) References Cited

U.S. PATENT DOCUMENTS

| | | | |
|---|---|---|---|
| 5,007,024 A | * | 4/1991 | Tanaka ................. G11C 11/419 |
| | | | 365/207 |
| 6,370,060 B2 | | 4/2002 | Takata et al. |
| 6,833,737 B2 | | 12/2004 | Aipperspach |

(Continued)

FOREIGN PATENT DOCUMENTS

| | | |
|---|---|---|
| JP | H08-255495 A | 10/1996 |
| JP | 2001-307494 A | 11/2001 |

(Continued)

OTHER PUBLICATIONS

Office Action mailed Sep. 30, 2025 in corresponding Japanese Patent Application No. 2022-151634, with English machine translation, 6 pages.

*Primary Examiner* — Mushfique Siddique
(74) *Attorney, Agent, or Firm* — Kim & Stewart LLP

(57) ABSTRACT

According to one embodiment, a complementary and latching sense amplifier circuit includes a sense amplifier main unit that receives an input signal input from each of a pair of input terminals to a corresponding gate terminal. The sense amplifier circuit includes: separation gates configured to electrically disconnect the input terminals and the corresponding respective gate terminals from each other before the sense amplifier main unit is effectively put into an enabled state; and capacitive elements having a same capacitance, each of the capacitive elements being connected between the corresponding gate terminal and a power supply.

18 Claims, 8 Drawing Sheets

(56) References Cited

U.S. PATENT DOCUMENTS

| | | | |
|---|---|---|---|
| 8,305,815 B2 * | 11/2012 | La Rosa | G11C 16/24 |
| | | | 365/207 |
| 8,400,821 B2 | 3/2013 | Tachibana | |
| 9,552,864 B1 | 1/2017 | Vimercati | |
| 9,852,783 B1 * | 12/2017 | Na | G11C 7/08 |
| 9,858,978 B2 | 1/2018 | Vimercati | |
| 10,438,642 B2 | 10/2019 | Vimercati | |
| 10,600,467 B2 | 3/2020 | Vimercati | |
| 2002/0030514 A1 | 3/2002 | Bailey et al. | |
| 2003/0235069 A1 * | 12/2003 | Ooishi | G11C 11/1673 |
| | | | 365/158 |
| 2004/0150470 A1 | 8/2004 | Aipperspach | |
| 2016/0248408 A1 | 8/2016 | Huang et al. | |
| 2017/0263302 A1 | 9/2017 | Vimercati | |
| 2017/0345509 A1 * | 11/2017 | Tran | G11C 7/065 |
| 2018/0108393 A1 | 4/2018 | Vimercati | |
| 2019/0066805 A1 * | 2/2019 | Tran | G11C 7/08 |
| 2020/0035285 A1 | 1/2020 | Vimercati | |
| 2020/0075065 A1 * | 3/2020 | Jeong | H03F 1/0205 |
| 2021/0326267 A1 | 10/2021 | Okabe et al. | |
| 2023/0057357 A1 * | 2/2023 | Lin | H03K 3/35613 |
| 2023/0145662 A1 * | 5/2023 | Takeda | H03F 3/45475 |
| | | | 330/253 |

FOREIGN PATENT DOCUMENTS

| | | |
|---|---|---|
| JP | 2004234822 A | 8/2004 |
| JP | 2005063633 A | 3/2005 |
| JP | 2007323712 A | 12/2007 |
| JP | 2012-113769 A | 6/2012 |
| JP | 2019511804 A | 4/2019 |
| JP | 2019149216 A | 9/2019 |
| JP | 2021-174562 A | 11/2021 |

* cited by examiner

SENSE AMPLIFIER CIRCUIT AND FOR SEMICONDUCTOR MEMORY DEVICE WITH CAPACITIVE ELEMENTS FOR INCREASED READ MARGIN

CROSS-REFERENCE TO RELATED APPLICATIONS

This application is based upon and claims the benefit of priority from Japanese Patent Application No. 2022-151634, filed on Sep. 22, 2022; the entire contents of which are incorporated herein by reference.

FIELD

Embodiments described herein relate generally to a sense amplifier circuit and a semiconductor memory device.

BACKGROUND

In recent years, a sense amplifier circuit has been known as a circuit that reads a minute signal of, for example, data stored in a memory cell. When complementary inputs of such a sense amplifier circuit are performed, a bit line side input and a reference potential side input have different capacitances.

Thus, asymmetric coupling noise occurs on the complementary inputs when the sense amplifier operates, which causes erroneous reading. Also, since the reference potential side input has a high impedance, if fluctuations caused by the coupling noise are large, a reference voltage becomes unstable by the next cycle, which causes erroneous reading.

In order to solve these problems, it has been conventionally proposed to add a stabilizing capacitance to a complementary pair to reduce coupling noise. However, the increase of capacity reduces the reading speed and also increases the installation area.

Also, it has been proposed to add a noise canceling circuit to cancel coupling noise. However, manufacturing variation in the noise canceling circuit itself causes a new problem of increased offset voltage of the sense amplifier.

Thus, it is desired to provide a sense amplifier circuit and a semiconductor memory device, which can reduce the influence of a capacitance difference between a bit line side input and a reference potential side input and increase a reading margin to enable highly reliable operation.

DETAILED DESCRIPTION

In general, according to one embodiment, a complementary and latching sense amplifier circuit includes a sense amplifier main unit that receives an input signal input from each of a pair of input terminals to a corresponding gate terminal. The sense amplifier circuit includes: separation gates configured to electrically disconnect the input terminals and the corresponding respective gate terminals from each other before the sense amplifier main unit is effectively put into an enabled state; and capacitive elements having a same capacitance, each of the capacitive elements being connected between the corresponding gate terminal and a power supply.

Exemplary embodiments of a semiconductor memory device will be explained below in detail with reference to the accompanying drawings. The present invention is not limited to the following embodiments.

Figure 1:
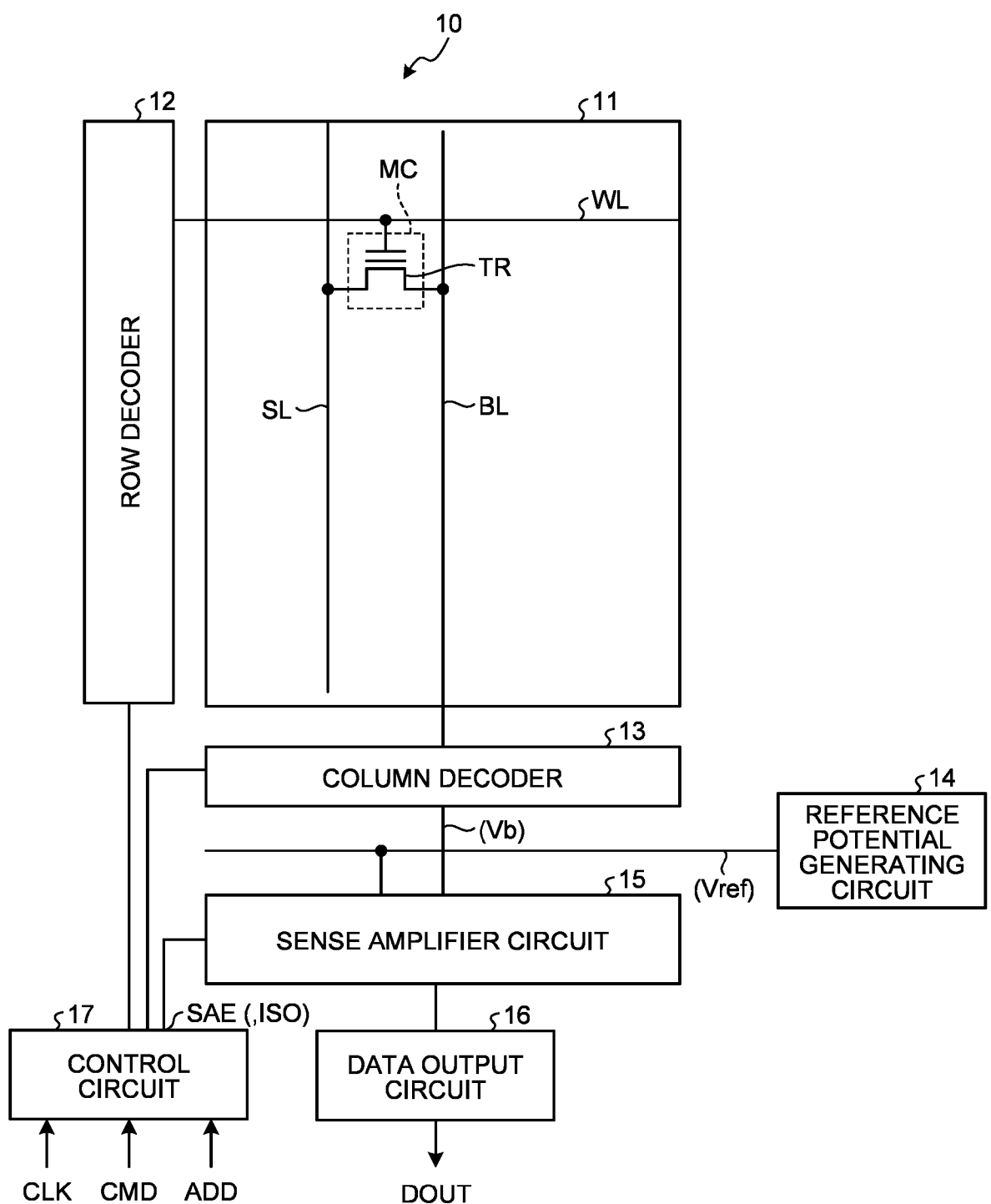
FIG. 1 is an explanatory diagram of the outline configuration of a semiconductor memory device according to an embodiment.

FIG. 1 is an explanatory diagram of the outline configuration of the semiconductor memory device according to an embodiment. A semiconductor memory device 10 is configured as a NOR flash memory. As illustrated in FIG. 1, the semiconductor memory device 10 includes a memory cell array 11, a row decoder 12, a column decoder 13, a reference potential generating circuit 14, a sense amplifier circuit 15, a data output circuit 16, and a control circuit 17.

The memory cell array 11 includes a plurality of memory cells MC arranged in a grid pattern. Also, the memory cell array includes a plurality of word lines WL, a plurality of source lines SL, and a plurality of bit lines BL.

To facilitate understanding, FIG. 1 illustrates, among the memory cells constituting the memory cell array, only the memory cell MC in a selected state, and illustrates only the word line WL, the source line SL, and the bit line BL corresponding to the memory cell MC in a selected state.

The memory cell MC includes a memory cell transistor TR having a source terminal connected to the source line SL, a gate terminal connected to the word line WL, and a drain terminal connected to the bit line BL.

The row decoder 12 puts the word line WL corresponding to the memory cell MC to be read into an enabled state under control of the control circuit 17. The column decoder 13 puts the source line SL and the bit line BL corresponding to the memory cell MC to be read into an enabled state under control of the control circuit 17.

The reference potential generating circuit 14 generates a reference potential and supplies the reference potential to the sense amplifier circuit 15. The sense amplifier circuit 15 compares a bit line voltage Vb corresponding to the memory cell MC in a selected state with a reference voltage Vref at a predetermined timing, determines data of the memory cell MC, and outputs a result of the determination to the data output circuit 16.

The data output circuit 16 outputs read data DOUT in accordance with the output of the sense amplifier circuit 15.

The control circuit 17 controls the row decoder 12, the column decoder 13, and the sense amplifier circuit 15 so as to perform writing, reading, or erasing of data on the corresponding memory cell MC in accordance with a clock signal CLK from a host device (e.g., an MPU), which is not illustrated, command data CMD, and address data ADD.

Figure 2:
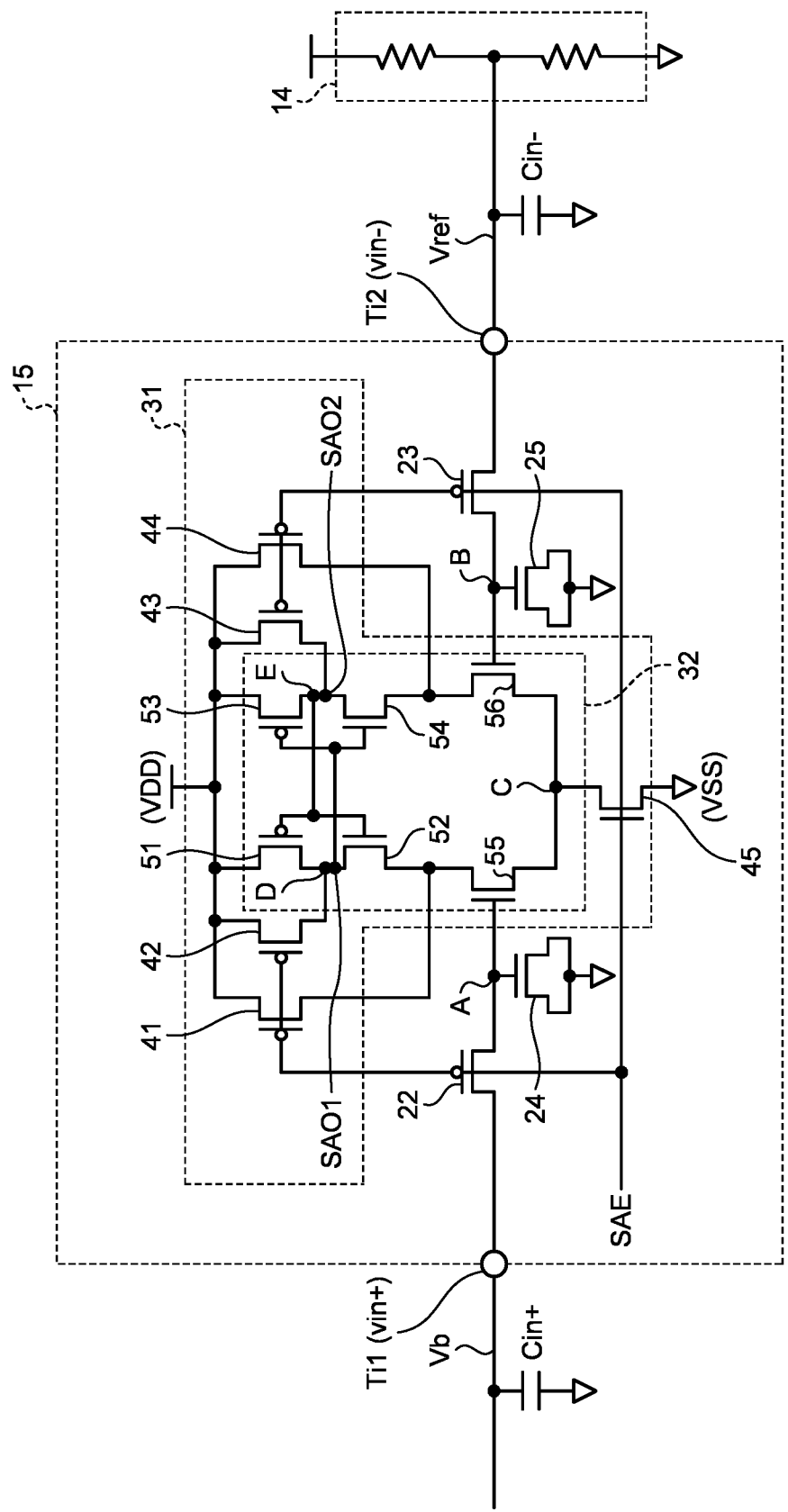
FIG. 2 is an explanatory diagram of an example of the main part configuration of the sense amplifier circuit of the embodiment.

Next, the configuration of the sense amplifier circuit 15 will be described. FIG. 2 is an explanatory diagram of an example of the main part configuration of the sense amplifier circuit of the embodiment. The sense amplifier circuit 15 includes a latching sense amplifier unit 21, a first separation gate 22, a second separation gate 23, a first equivalent capacitive element 24, and a second equivalent capacitive element 25.

The latching sense amplifier unit 21 includes a sense amplifier enabling unit 31, and a sense amplifier main unit 32.

The sense amplifier enabling unit 31 includes a first P channel MOS transistor 41, a second P channel MOS transistor 42, a third P channel MOS transistor 43, a fourth P channel MOS transistor 44, and an N channel MOS transistor 45.

The first P channel MOS transistor 41 has a gate terminal to which a sense amplifier enabling signal SAE is input and a source terminal that is connected to a high potential side power supply VDD. The second P channel MOS transistor 42 has a gate terminal to which the sense amplifier enabling signal SAE is input and a source terminal connected to the high potential side power supply VDD.

The third P channel MOS transistor 43 has a gate terminal to which the sense amplifier enabling signal SAE is input and a source terminal connected to the high potential side power supply VDD. The fourth P channel MOS transistor 44 has a gate terminal to which the sense amplifier enabling signal SAE is input and a source terminal connected to the high potential side power supply VDD.

The N channel MOS transistor 45 has a gate terminal to which the sense amplifier enabling signal SAE is input and a source terminal connected to a low potential side power supply VSS.

The sense amplifier main unit 32 includes a first P channel MOS transistor 51, a first N channel MOS transistor 52, a second P channel MOS transistor 53, a second N channel MOS transistor 54, a first input N channel MOS transistor 55, and a second input N channel MOS transistor 56.

The first P channel MOS transistor 51 has a source terminal connected to the high potential side power supply VDD, a drain terminal connected to a drain terminal of the second P channel MOS transistor 42 via a first sense amplifier output terminal SAO1, and a gate terminal connected to a second sense amplifier output terminal SAO2.

The first N channel MOS transistor 52 is connected in series to the first P channel MOS transistor 51, and has a drain terminal connected to a drain terminal of the first P channel MOS transistor 41 and a gate terminal connected to the second sense amplifier output terminal SAO2.

The second P channel MOS transistor 53 has a source terminal connected to the high potential side power supply VDD, a drain terminal connected to the second sense amplifier output terminal SAO2, and a gate terminal connected to the first sense amplifier output terminal SAO1.

The second N channel MOS transistor 54 is connected in series to the second P channel MOS transistor 53, and has a drain terminal connected to a drain terminal of the third P channel MOS transistor 43 and a gate terminal connected to the first sense amplifier output terminal SAO1.

The first input N channel MOS transistor 55 is connected in series between the first N channel MOS transistor 52 and the N channel MOS transistor 45 and has a gate terminal connected to a first input terminal Ti1.

The second input N channel MOS transistor 56 is connected in series between the second N channel MOS transistor 54 and the N channel MOS transistor 45 and has a gate terminal connected to a second input terminal Ti2.

The first separation gate 22 has a gate terminal to which the sense amplifier enabling signal SAE is input. The first separation gate 22 is connected between the first input terminal Ti1 and the gate terminal of the first input N channel MOS transistor 55. The first separation gate 22 electrically disconnects the latching sense amplifier unit 21 from the first input terminal Ti1 when sensing is enabled.

The second separation gate 23 has a gate terminal to which the sense amplifier enabling signal SAE is input. The second separation gate 23 is connected between the second input terminal Ti2 and the gate terminal of the second input N channel MOS transistor 56. The second separation gate 23 electrically disconnects the latching sense amplifier unit 21 from the second input terminal Ti2 when sensing is enabled.

The first equivalent capacitive element 24 is configured as an N channel MOS transistor having a gate terminal connected to the gate terminal of the first input N channel MOS transistor 55, and a source terminal and a drain terminal connected to the low potential side power supply VSS. Thus, the first equivalent capacitive element 24 effectively functions as a capacitive element having a predetermined capacitance.

Similarly, the second equivalent capacitive element 25 is configured as an N channel MOS transistor having a gate terminal connected to the gate terminal of the second input N channel MOS transistor 56, and a source terminal and a drain terminal connected to the low potential side power supply VSS. Thus, the second equivalent capacitive element 25 effectively functions as a capacitive element having a predetermined capacitance.

The first equivalent capacitive element 24 and the second equivalent capacitive element 25 are formed in the same configuration and the same size in the same semiconductor manufacturing process as each other and thus have the same capacitance as each other.

In the above configuration, the first input terminal Ti1 is connected to the bit line corresponding to the memory cell MC, and the bit line voltage Vb is applied to the first input terminal Ti1. The second input terminal Ti2 is connected to the reference potential generating circuit 14, and the reference voltage Vref is applied to the second input terminal Ti2.

Next, operation of the sense amplifier circuit 15 of the embodiment will be described. First, conventional problems will be described. When complementary inputs are performed in a conventional sense amplifier circuit, viewed from the sense amplifier circuit, a capacitance Cin+ of a bit line side input (Vin+), which is an input on the first input terminal Ti1 side, differs from a capacitance Cin− of a reference potential side input (Vin−), which is an input on the second input terminal Ti2 side.

That is, the following is satisfied.

$$Cin+ \neq Cin-$$

Thus, when the sense amplifier circuit operates, parasitic capacitive coupling between the gate terminal and the source terminal and between the gate terminal and the drain terminal of each of a pair of input MOS transistors corresponding to the first input N channel MOS transistor 55 and the second input N channel MOS transistor 56 of the present embodiment causes asymmetric coupling noise on the complementary inputs, which causes erroneous reading.

Also, since the reference potential has a high impedance, if fluctuations caused by the coupling noise are large, a reference voltage becomes unstable by the next cycle, which causes erroneous reading.

Thus, it has been conventionally proposed to add a stabilizing capacitance to a complementary pair for each sense amplifier to reduce coupling noise. However, the addition of the stabilizing capacitance reduces the reading speed and also increases the installation area.

Accordingly, the area of the circuit increases, which constitutes an obstacle to downsizing the device.

Also, it has been proposed to add a noise canceling circuit to cancel coupling noise. However, manufacturing variation in the noise canceling circuit itself may increase an offset voltage of the sense amplifier circuit.

The present embodiment reduces the influence of the capacitance difference between the bit line side input and the reference potential side input and increases a reading margin to enable highly reliable operation without providing the stabilizing capacitance or the noise canceling circuit.

More specifically, when sensing is enabled (when the sense amplifier circuit reads data: at sensing), the first separation gate 22 and the second separation gate 23 electrically disconnect the latching sense amplifier unit 21 from the first input terminal Ti1 and the second input terminal Ti2. Further, the first equivalent capacitive element 24 and the second equivalent capacitive element 25 make the capacitances in the complementary pair equal to each other.

Then, after the sense amplifier circuit completes data reading, precharge of the first equivalent capacitive element 24 and the second equivalent capacitive element 25 is completed. Then, the first separation gate 22 and the second separation gate 23 electrically connect the latching sense amplifier unit 21 to the first input terminal Ti1 and the second input terminal Ti2 again. Accordingly, the operation can be performed without being affected by coupling noise.

Figure 3:
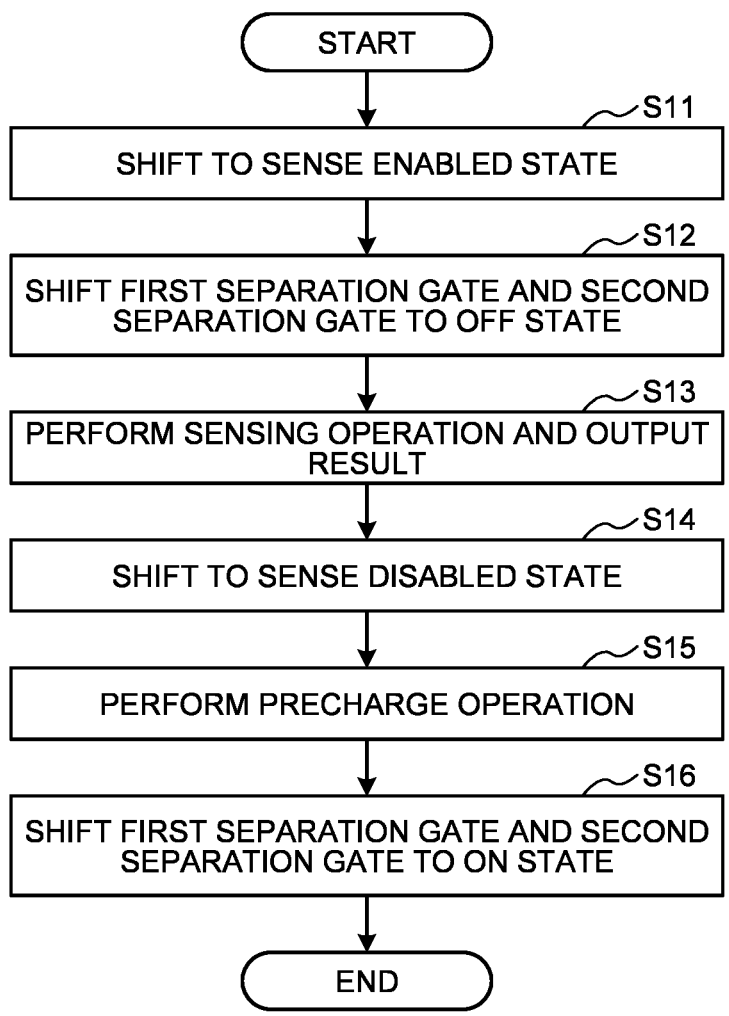
FIG. 3 is an operation process flowchart of the embodiment.
Figure 4:
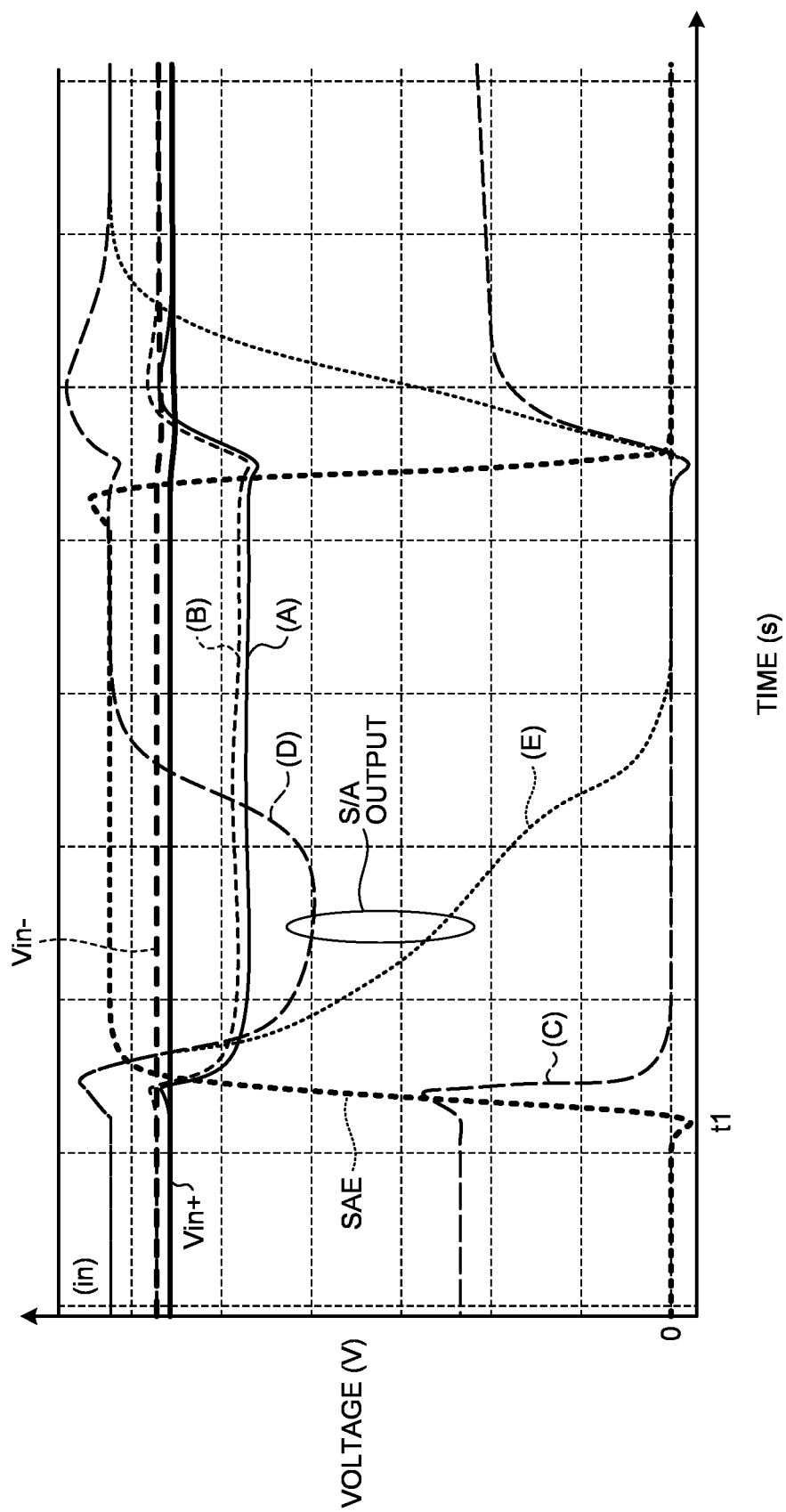
FIG. 4 is an explanatory diagram of a signal waveform at each point.

FIG. 3 is an operation process flowchart of the embodiment. FIG. 4 is an explanatory diagram of a signal waveform at each point. In the following description, the sense amplifier enabling signal SAE is high active. The signal waveforms in FIG. 4 are signal waveforms at points A to E in FIG. 2.

The control circuit 17 outputs the sense amplifier enabling signal SAE of "H" level to the sense amplifier circuit 15 and shifts the sense amplifier circuit 15 to a sense enabled state (step S11). Accordingly, the P channel MOS transistors constituting the first separation gate 22 and the second separation gate 23 are put into an OFF state. As a result, the first input terminal Ti1 and the second input terminal Ti2 are electrically disconnected from the sense amplifier main unit 32 (step S12).

More specifically, as illustrated at time t1 in FIG. 4, when the sense amplifier enabling signal SAE transitions to "H" level, the P channel MOS transistors constituting the first separation gate 22 and the second separation gate 23 are put into an OFF state. This brings the sense amplifier main unit 32 into a state unaffected by the difference between the capacitance Cin+ of the bit line side input (Vin+), which is the input on the first input terminal Ti1 side, and the capacitance Cin− of the reference potential side input (Vin−), which is the input on the second input terminal Ti2 side.

In addition, the sense amplifier main unit 32 is in a state in which the first equivalent capacitive element 24 and the second equivalent capacitive element 25 having the same capacitance as each other are connected to each other.

The voltages at the point A and the point B drop due to coupling noise. However, since the first equivalent capacitive element 24 and the second equivalent capacitive element 25 have the same capacitance as each other, even if coupling noise occurs, the magnitude thereof is equal in the complementary pair and the influences thereof thus cancel each other out. As a result, there is no influence of coupling noise as in the conventional example.

In this state, the sense amplifier main unit 32 executes a sensing operation and outputs a sensing result from the first sense amplifier output terminal SAO1 and the second sense amplifier output terminal SAO2 when the sensing operation is completed (step S13).

Thus, outputs of the first sense amplifier output terminal SAO1 and the second sense amplifier output terminal SAO2 can be obtained as highly reliable outputs that can increase voltage changes as illustrated as voltages at the point D and the point E in FIG. 4, can reliably identify stored data, and are unaffected by coupling noise.

Then, after the sense amplifier main unit 32 completes the output of the sensing result, the control circuit 17 outputs the sense amplifier enabling signal SAE of "L" level to the sense amplifier circuit 15 and shifts the sense amplifier circuit 15 to a sense disabled state (step S14), and precharges the first equivalent capacitive element 24 and the second equivalent capacitive element 25 (step S15).

After the precharge of the first equivalent capacitive element 24 and the second equivalent capacitive element 25 is completed, the control circuit 17 puts the P channel MOS transistors constituting the first separation gate 22 and the second separation gate 23 into an ON state (step S16), and the sense amplifier main unit 32 shifts to a standby state.

As described above, according to the present embodiment, since no stabilizing capacitance is required, it is possible to achieve a sense amplifier that is capable of operating at high speed and has a small area. Also, since no noise canceling circuit is required, it is possible to reduce the offset voltage and achieve high speed operation.

Figure 5:
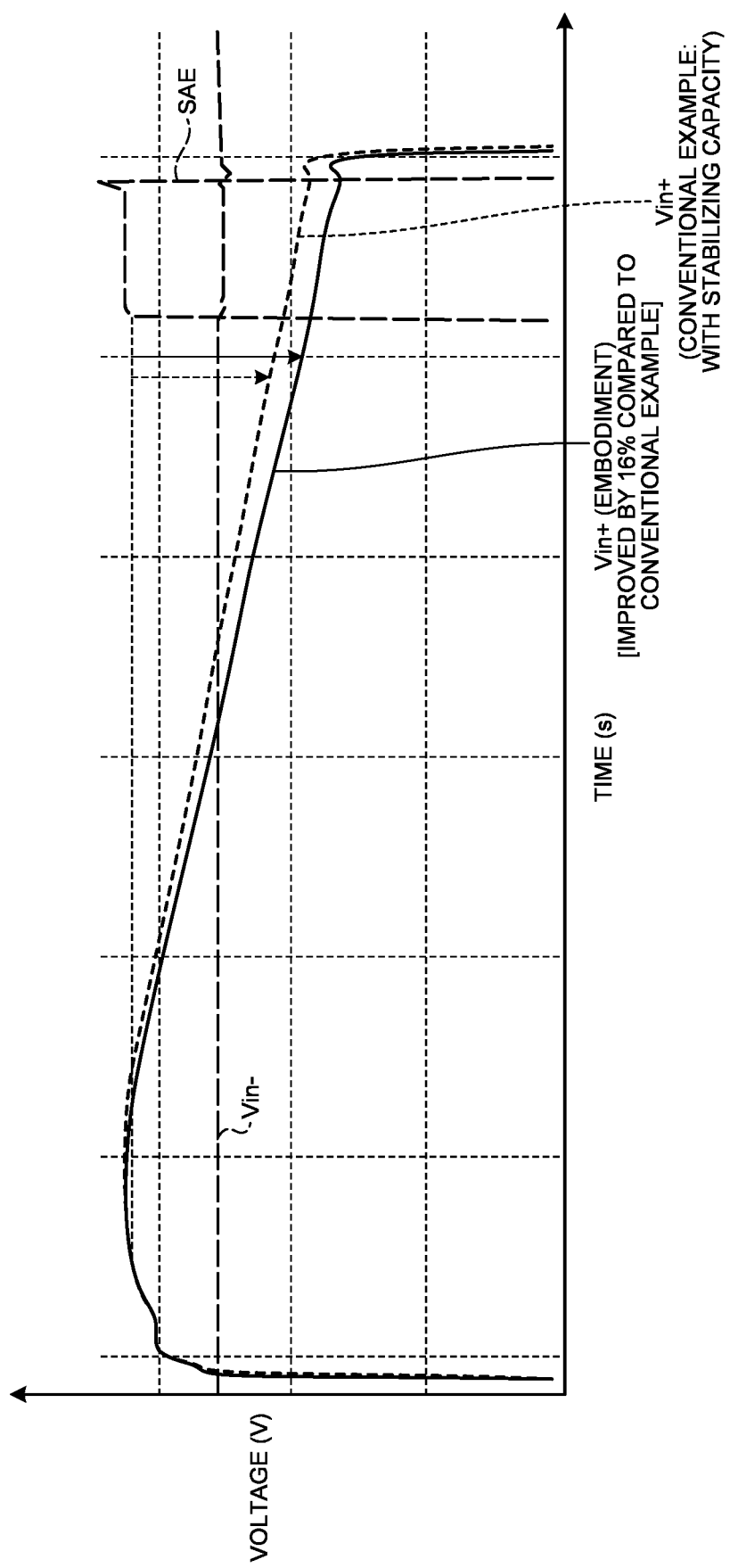
FIG. 5 is a diagram for explaining changes in input signal voltage in a conventional example having a stabilizing capacitance and the present embodiment.

FIG. 5 is a diagram for explaining changes in input signal voltage in a conventional example having a stabilizing capacitance and the present embodiment. According to the present embodiment, as illustrated in FIG. 5, it is possible to achieve rapid voltage changes in the input signal (e.g., in the case of FIG. 5, improved by approximately 16% compared to the conventional example). Thus, higher speed operation can be achieved.

Figure 6:
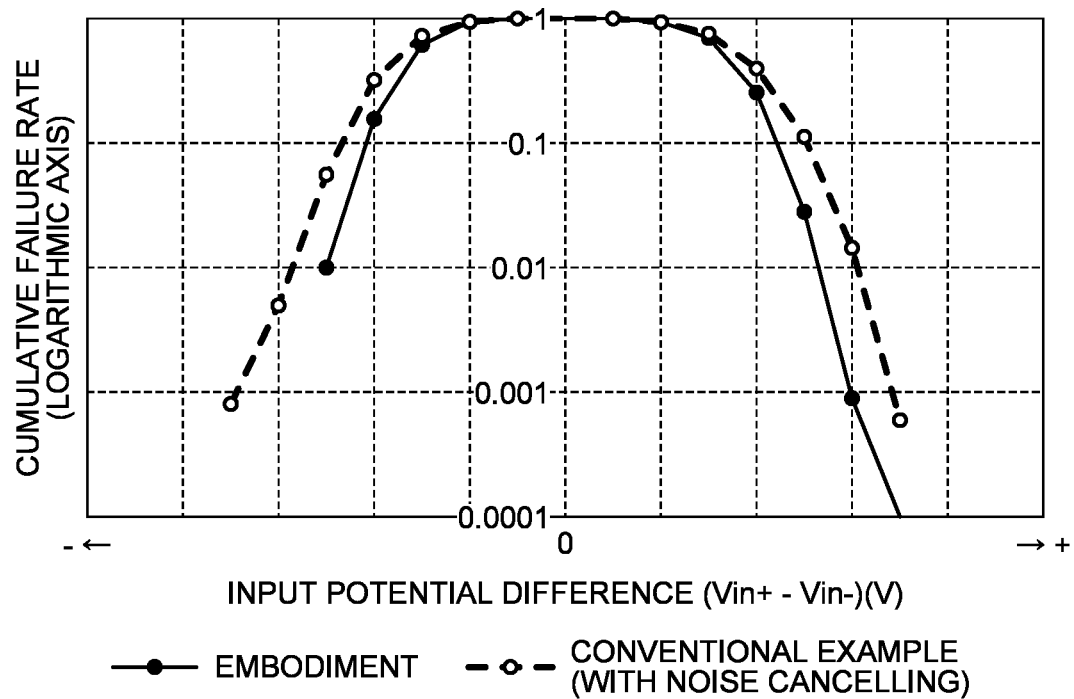
FIG. 6 is a diagram illustrating cumulative failure rate in the conventional example having the noise canceling circuit and the present embodiment.

FIG. 6 is a diagram illustrating cumulative failure rate in the conventional example having the noise canceling circuit and the present embodiment. As illustrated in FIG. 6, when compared for the same input potential difference, the cumulative failure rate corresponding to erroneous determination can be made extremely lower than that in the conventional example, and erroneous determination does not occur in a state with smaller input potential difference.

In addition, according to the embodiment, reference potential fluctuations can be reduced. Thus, data fluctuations are less likely to occur, which can improve reliability.

Figure 7:
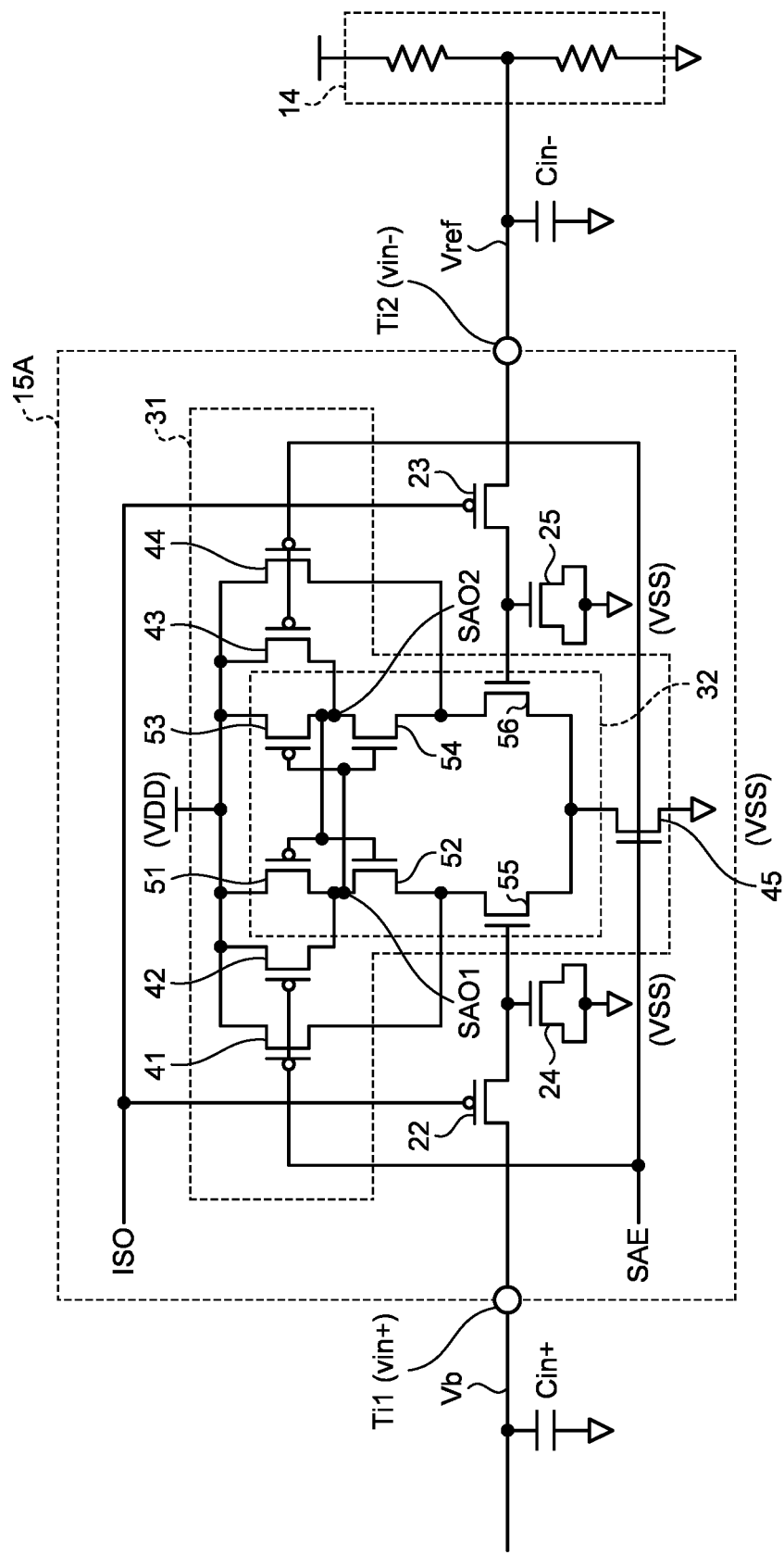
FIG. 7 is an explanatory diagram of an example of the main part configuration of a sense amplifier circuit of a modification of the embodiment.

Next, a modification of the embodiment will be described. FIG. 7 is an explanatory diagram of an example of the main part configuration of a sense amplifier circuit of a modification of the embodiment. In FIG. 7, parts similar to those in FIG. 2 are designated by the same reference signs as in FIG. 2. In FIG. 7, a difference from FIG. 2 is that the control circuit 17 controls the first separation gate 22 and the second separation gate 23 using a control signal ISO different from the sense amplifier enabling signal SAE.

In the above embodiment, the control circuit 17 controls the first separation gate 22 and the second separation gate 23 using the sense amplifier enabling signal SAE. Thus, depending on circumstances, a shift to a data reading state may be made in a state in which the first input terminal Ti1 and the second input terminal Ti2 cannot be electrically disconnected from the sense amplifier main unit 32 as with the conventional configuration.

Also, when data output is finished, the sense amplifier main unit 32 may be electrically connected to the first input terminal Ti1 and the second input terminal Ti2 before a return to an initial state is surely made.

Figure 8:
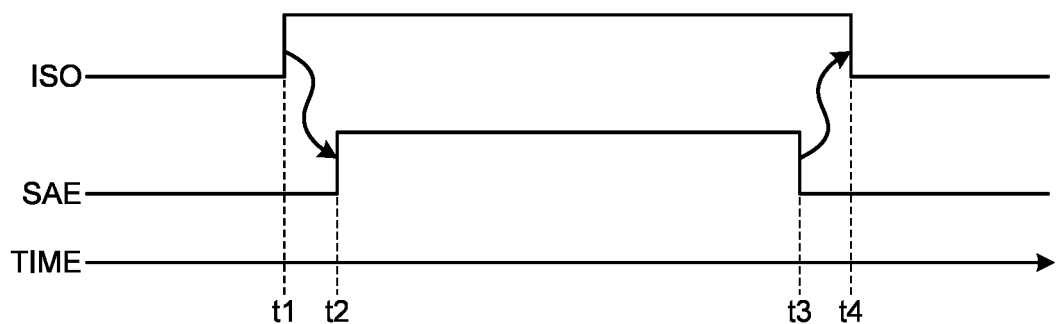
FIG. 8 is a timing chart of the modification of the embodiment.

FIG. 8 is a timing chart of the modification of the embodiment. In view of the above, in the modification of the embodiment, at time t1 before a shift to a sense enabled state is made, the control circuit 17 sets the control signal ISO to "H" level and controls the first separation gate 22 and the second separation gate 23 to surely shift the first separation gate 22 and the second separation gate 23 to an OFF state.

Then, at time t2 after the first separation gate 22 and the second separation gate 23 are surely put into an OFF state, the control circuit 17 sets the sense amplifier enabling signal SAE to "H" level and shifts the sense amplifier main unit 32 to an enabled state.

When the sense amplifier main unit 32 completes the output of the sensing result and reaches a sensing operation completed state, at time t3, the control circuit 17 sets the sense amplifier enabling signal SAE to "L" level and shifts the sense amplifier main unit 32 to a disabled state.

Then, at time t4 after the sense amplifier main unit 32 completely shifts to a disabled state, the control circuit 17 sets the control signal ISO to "L" level. Accordingly, the control circuit 17 controls the first separation gate 22 and the second separation gate 23, and the sense amplifier main unit 32 completes the output of the sensing result and reaches a sensing operation completed state. In addition, the control circuit 17 finishes the process in a state in which precharge of the first equivalent capacitive element 24 and the second equivalent capacitive element 25 is surely completed and a return to an initial state is made.

Thus, according to the modification of the embodiment, it is possible to more stably perform operation and further improve reliability in addition to the effects of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A complementary and latching sense amplifier circuit comprising:
   a sense amplifier main unit that includes two transistors and is configured to receive input signals that have been input through a pair of input terminals, at corresponding gate terminals of the two transistors;
   separation gates configured to electrically disconnect the input terminals and the corresponding respective gate terminals from each other when the sense amplifier main unit is put into an enabled state; and
   capacitive elements having a same capacitance, each of the capacitive elements being configured as a transistor of which a gate terminal is directly connected to a node that is between and directly connected to a corresponding gate terminal of the gate terminals and a corresponding separation gate of the separation gates and of which source and drain terminals are connected to a power supply and not to the corresponding separation gate of the separation gates.

2. The sense amplifier circuit according to claim 1, wherein
   the separation gates operate to electrically disconnect the input terminals and the corresponding respective gate terminals from each other by using a sense amplifier enabling signal that puts the sense amplifier main unit into the enabled state.

3. The sense amplifier circuit according to claim 1, wherein
   the separation gates operate to electrically disconnect the input terminals and the corresponding respective gate terminals from each other before the sense amplifier main unit is put into the enabled state, by using a control signal different from a sense amplifier enabling signal that puts the sense amplifier main unit into the enabled state.

4. The sense amplifier circuit according to claim 1, wherein
   the gate terminals are put into a floating state when the separation gates electrically disconnect the gate terminals from the respective input terminals.

5. The sense amplifier circuit according to claim 1, wherein
   the separation gates electrically connect the input terminals and the corresponding respective gate terminals to each other after precharge of the capacitive elements is completed after the sense amplifier main unit finishes a sensing operation.

6. The sense amplifier circuit according to claim 1, wherein
   each of the separation gates includes a P channel MOS transistor.

7. The sense amplifier circuit according to claim 1, wherein
   each of the capacitive elements includes an N channel MOS transistor.

8. The sense amplifier circuit according to claim 1, wherein
   one of the input terminals is connected to a bit line of a corresponding memory cell, and
   another of the input terminals is connected to a reference power supply.

9. The sense amplifier circuit according to claim 1, wherein neither of the capacitive elements is disposed in current paths between the input terminals and the corresponding terminals of the two transistors.

10. A semiconductor memory device comprising:
    memory cells configured to store data;
    bit lines connected to the memory cells; and
    a complementary and latching sense amplifier circuit configured to detect data stored in the memory cells in accordance with signals transmitted through the bit lines, the sense amplifier circuit including:
    a sense amplifier main unit that includes two transistors and is configured to receive input signals that have been input through pair of input terminals, at corresponding terminals of the two transistors;
    separation gates configured to electrically disconnect the input terminals and the corresponding respective gate terminals from each other when the sense amplifier main unit is put into an enabled state; and
    capacitive elements having a same capacitance, each of the capacitive elements being configured as a transistor of which a gate terminal is directly connected to a node that is between and directly connected to a corresponding gate terminal of the gate terminals and a corresponding separation gate of the separation gates and of which source and drain terminals are connected to a power supply and not to the corresponding separation gate of the separation gates.

11. The semiconductor memory device according to claim 10, wherein
the separation gates operate to electrically disconnect the input terminals and the corresponding respective gate terminals from each other by using a sense amplifier enabling signal that puts the sense amplifier main unit into the enabled state.

12. The semiconductor memory device according to claim 10, wherein
the separation gates operate to electrically disconnect the input terminals and the corresponding respective gate terminals from each other before the sense amplifier main unit is put into the enabled state, by using a control signal different from a sense amplifier enabling signal that puts the sense amplifier main unit into the enabled state.

13. The semiconductor memory device according to claim 10, wherein
the gate terminals are put into a floating state when the separation gates electrically disconnect the gate terminals from the respective input terminals.

14. The semiconductor memory device according to claim 10, wherein
the separation gates electrically connect the input terminals and the corresponding respective gate terminals to each other after precharge of the capacitive elements is completed after the sense amplifier main unit finishes a sensing operation.

15. The semiconductor memory device according to claim 10, wherein
each of the separation gates includes a P channel MOS transistor.

16. The semiconductor memory device according to claim 10, wherein
each of the capacitive elements includes an N channel MOS transistor.

17. The semiconductor memory device according to claim 10, wherein
one of the input terminals is connected to a bit line of a corresponding memory cell, and
another of the input terminals is connected to a reference power supply.

18. The semiconductor memory device according to claim 10, wherein neither of the capacitive elements is disposed in current paths between the input terminals and the corresponding terminals of the two transistors.

* * * * *